INVENTOR.
JOSEPH J. SLIWKOWSKI

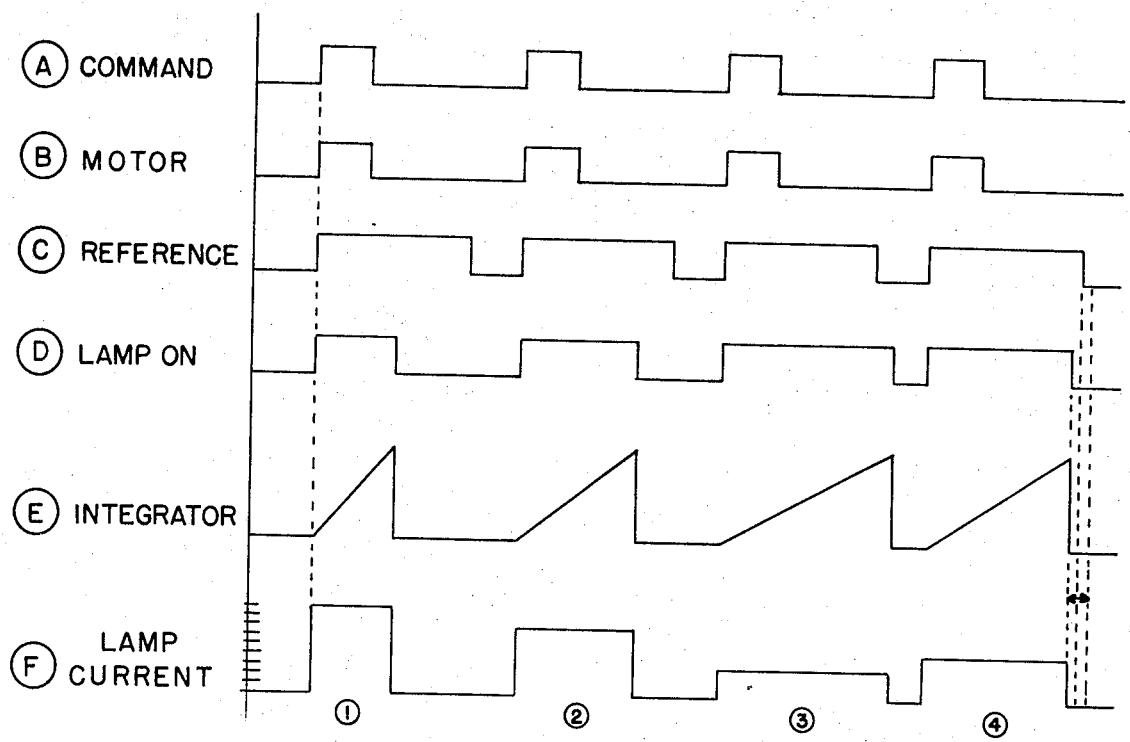
FIG. 3
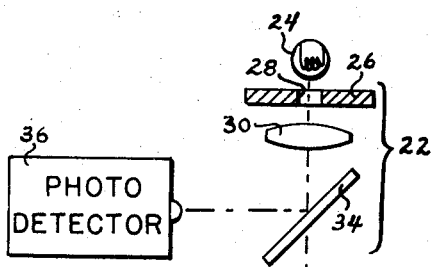
FIG. 2
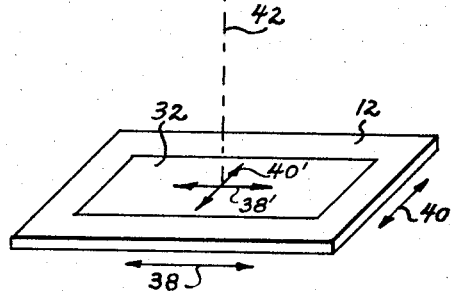

United States Patent Office 3,702,732
Patented Nov. 14, 1972

3,702,732
EXPOSURE CONTROL APPARATUS AND METHOD UTILIZING TIME VS INTENSITY TRADEOFF SERVO SYSTEM
Joseph J. Sliwkowski, Framingham, Mass., assignor to Computervision Corporation, Burlington, Mass.
Filed May 5, 1971, Ser. No. 140,344
Int. Cl. G03b 27/78
U.S. Cl. 355—68    9 Claims

ABSTRACT OF THE DISCLOSURE

An exposure control apparatus and method which utilizes a time vs. lamp intensity tradeoff servo system. The lamp intensity is regulated by the servo system to provide the minimum amount of lamp drive or intensity that will produce a predetermined exposure within the available exposure time. A two state gain adjustment is employed in the servo system to permit rapid convergence at a high gain and then a controlled, and small ripple of light intensity at a lower gain. The servo system automatically compensates for lamp intensity decay during lamp aging without requiring a high initial power drive.

BACKGROUND OF THE INVENTION

This invention relates to exposure control systems and methods in general and, more particularly, to an exposure control system and method for maximizing lamp life through the use of a time vs. intensity tradeoff servo system.

Many current photographic machines, such as, photoplotters, require an accurate exposure control system in order to maintain uniform quality in the photographically produced lines, symbols and other indica. Representative examples of photoplotters are found in the following United States Letters Pat. Nos. 3,072,014, issued Jan. 8, 1963 to G. O. Rawstron, for Photographic Apparatus for Producing Curved Lines; 3,247,761 issued Apr 26, 1966 to R. A. Herreman, et al. for Production of Printed Circuit Boards and the Like; 3,330,182, issued July 11, 1967 to H. J. Gerber, et al. for Device for Exposing Discrete Portions of a Photsensitive Surface to a Variable Intensity Light Beam; and 3,464,330, issued Sept. 2, 1969 to E. V. Lewis for Optical Writing Device.

In photographic plotting machines of the type described in the above-mentioned patents, it is desirable to replace the lamp light source as infrequently as possible in order to minimize down time and inconvenience. Since the light output of the lamp decays as the lamp ages, the lamps are normally driven their entire life cycle at a power level that will produce a sufficient exposure despite the gradual diminution in light intensity produced by aging. During the early portion of the lamp's life cycle, the extra lamp drive is unnecessary and the lamp is needlessly over driven. Since the maximum lamp life is related to the peak power of the lamp drive, the lamp life is decreased by overdriving the lamp during the early portion of its life cycle.

It is accordingly a general object of the present invention to provide an exposure control apparatus and method for photographic machines which maximizes lamp life.

It is a specific object of the present invention to provide an exposure control apparatus and method which automatically adjusts the lamp drive or intensity to a minimum level consistent with the available exposure time.

It is still another object of the present invention to provide an exposure control method and apparatus which compensates for decreased lamp output during aging.

It is a feature of the present invention that the lamp output compensation is achieved without overdriving the lamp during the early portion of its life cycle.

It is another feature of the invention that the exposure control apparatus can be retrofitted to existing photographic machines including photoplotters generally and, specifically digitally driven photoplotters.

These objects and features and other objects and features of the present invention will best be understood from a detailed description of a preferred embodiment thereof, selected for purposes of illustration and shown in the accompanying drawings in which:

FIG. 2 is another diagrammatic view illustrating the main components of the photoplotter optical head and the physical relationship of the plotting table and photosensitive medium wtih respect to the optical head; and, FIGS. 3A through 3F are waveform, diagrams which depict the waveforms for the command pulses, motor pulses, reference pulses, lamp ON-OFF cycle, integrator voltage and lamp current.

Figure 1:
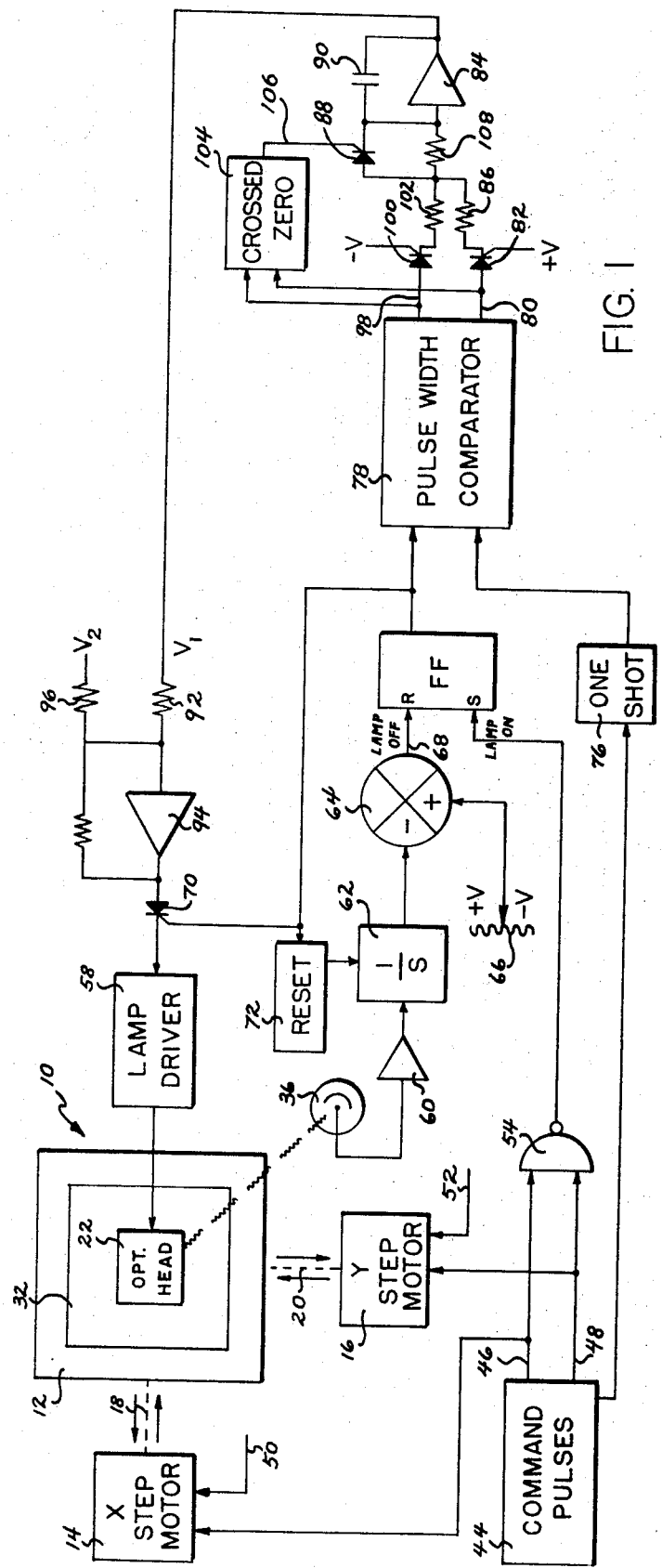
FIG. 1 is a diagrammatic view in partial block form of a digitally driven photoplotter which incorporates the exposure control apparatus of the present invention.

Turning now to the drawings, there is shown a photoplotter indicated generally by the reference numeral 10, which incorporates the exposure control system and method of the present invention. The photoplotter 10 comprises a digitally driven plotting table or plotting surface 12 that is driven in translational movement by X and Y axes stepping motors 14 and 16, respectively, through appropriate gearing indicated representationally in FIG. 1 by the dashed lines 18 and 20.

Positioned above the plotting table 12 is an optical head 22 containing an electrically actuated light source 24 an aperture wheel 26 having at least one light aperture 28 and optical system 30 for projecting an image of the light aperture 28 upon a photosensitive medium, e.g., film 32, located on the moveable table 12, a beam splitter 34 and a photodetector 36. The photodetector 36 is mounted within the optical head so that a portion of the light from beam splitter 34 will impinge upon the photosensitive element (not shown) of the photodetector. The output voltage from photodetector 36 will therefore represent the instantaneous amount of light impinging upon the photosensitive medium 32.

It will be understood that other structural configurations for the photodetector can be employed to obtain an electrical signal having a characteristic which represents the amount of light falling upon the film 32. For example, the photodetector can be mounted to intercept the light reflected from the photosensitive medium or surface 32 during the exposure thereof.

Looking specifically at FIG. 2, the motion of plotting table 12 along the X and Y axes is indicated by the motion arrows 38 and 40, respectively. The corresponding relative movement of the light beam 42 upon the film surface 32 is shown by the corresponding motion arrows 38' and 40'. It will be appreciated that the relative movement of the light beam 42 with respect to the photosensitive medium 32 can be achieved in a number of ways, such as, by moving the plotting table 12 as shown in the illustrative example of FIGS. 1 and 2, or by moving the optical head 22 itself with respect to the plotting table-film combination 12 and 32, respectively, or by moving both the light beam 42 and the plotting table-film combination. The exposure control apparatus of the present invention is suitable for use with all three types of drive systems for the light beam and photosensitive medium. However, for purposes of illustration only, the following description will be limited to the digitally driven plotting table-fixed optical head configuration.

The timing synchronization and control of the photoplotter 10 is provided by command pulses from a command pulse generator 44. The command pulses as shown in waveform A of FIG. 3, control the actuation time of the digitally driven step motors 14 and 16. A command pulse on pulse generator output line 46 actuates the X-step motor 14. Similarly, a command pulse on output line 48 actuates the Y-step motor 16. Waveform B of FIG. 3 illustrates the corresponding motor pulses for the X and Y step motors. The direction of stepping is determined by program signals on X and Y step motor input leads 50 and 52, respectively. The program signals can be obtained from a variety of conventional sources including a computer or punched tape (not shown).

The X and Y step motor command pulses on output lines 46 and 48 are applied to an OR gate 54 which in turn is connected to the Set input of a flip-flop 56. If flip-flop 56 is in the Set condition, lamp driver 58 energizes the light source lamp 24. The control circuitry for lamp driver 58 and the generation of the input voltages that are applied to the lamp driver 58 to obtain the desired change in the intensity of the light source lamp 24 will be discussed below. For the moment, it is sufficient to note that the light source 24 will be ON whenever flip-flop 56 is in the Set condition.

From an examination of Waveforms A, B, and D in FIG. 3, it can be seen that lamp 24 is turned ON for each increment of X and Y movement of the plotting table 12. With lamp 24 turned ON, an image of the light aperture 28 is projected by the optical system 30 down through beam splitter 34 and onto the film 32. The amount of light impinging upon the surface film 32 is measured by photodetector 36 which generates an output voltage that is proportional to the amount of such light. If desired, the output voltage of the photodetector 36 can be amplified by an amplifier 60 before integrating the photodetector output voltage in integrator 62. The integrated photodetector output voltage is applied as one input to a voltage comparator 64. The other input to comparator 64 is an adjustable voltage obtained from a voltage source 66. When the integrated photodetector output voltage reaches the level of the reference voltage from source 66, the comparator 64 produces a comparator equality signal on line 68 which resets flip-flop 56. The resetting of flip-flop 56 turns off the light source 24 by opening a pulse actuated switch 70 which interrupts the input to lamp driver 58. At the same time, flip-flop 56 also actuates a reset circuit 72 which discharges the integrator 62.

In the preceding description of the operation of the photoplotter exposure system, it was assumed that the light source 24 was operated at a predetermined intensity level governed by the input voltage to the lamp driver 58. The light exposure of the photosensitive medium is $E = I \times T$ where I is the amount of light impinging upon the medium and where T is the time during which the light impinges upon the photosensitive medium. Since I is a function of the light output or intensity of lamp source 24, assuming that no variation is introduced in the optical system between the light source 24 and the surface of film 32 during the time of exposure, the exposure to film 32 will be determined by the duration of the lamp ON cycle. The lamp ON time is in turn controlled by the magnitude of the reference voltage applied to the voltage comparator 64.

If the exposure control apparatus and method of the present invention is employed in a digitally driven photoplotter, as shown for purposes of illustration in FIG. 1, the time available for each exposure is subject to the constraint of the repetition rate of the step motors 14 and 16. The interval between each incremental movement of the step motors defines the available exposure time $T_a$.

It will be appreciated that the desired exposure E of the film 32 can be obtained within the available exposure time by varying the intensity of the light source 24 and/or the length of the exposure. However, the length of the exposure T must be equal to or less than the available exposure time $T_a$.

Since the life of lamp 24 is a function of the peak power applied to the lamp, it is desirable to keep the lamp current at as low a level as possible during each exposure. Expressed in another way, it is desirable to keep the lamp 24 ON during substantially all of the available exposure time $T_a$.

The following description is directed to the circuitry which performs the function of adjusting lamp intensity to a value that permits the exposure time to be as long as possible within the limits of the available exposure time $T_a$. Looking at FIG. 1 and 3, the command pulses from command pulse generator 44 are applied on line 74 to a One Shot 76. The output of the One Shot is shown in Waveform C of FIG. 3 and constitutes a time reference pulse which defines the available time $T_a$ for the light exposure of the photosensitive film 32. The One Shot reference pulse is applied as one input to a pulse width comparator 78. With the output of the One Shot 76 as a time reference, the pulse width comparator 78 compares the length of time that the lamp 24 is ON with the available exposure time.

If the lamp ON time is less than the available exposure time (as shown by lamp ON Waveform D-1,) comparator 78 produces a "decrease lamp intensity" output pulse or signal on line 80. The "decrease lamp intensity" pulse closes a pulse actuated switch 82 which in turn applies a positive voltage to amplifier 84 through resistor 86 and another pulse actuated switch 88. A feedback capacitor 90 is connected between the input and output of amplifier 84. With switch 88 in the normally closed position, the amplifier 84 has maximum gain.

The output of amplifier 84 comprises a discretely ramped voltage which goes up or down depending upon the desired correction of lamp intensity. This correction voltage $V_1$ is aplied through resistor 92 to an operational amplifier indicated generally by the reference numeral 94. The initial lamp drive is determined by a reference voltage $V_2$ which is applied to the operational amplifier 94 through resistor 96. The operational smplifier 94 produces an output voltage which is the arithmetic sum of the voltages $V_1$ and $V_2$. The output voltage of Op Amp 94 is applied as the input to lamp driver 58 though the normally closed pulse actuated switch 70.

With the correction voltage $V_2$ present at the Op Amp the lamp drive is reduced thereby causing a reduction in the lamp current as shown in Waveform F-2. The reduction in lamp current produces a concommitant reduction in the intensity of the illumination impinging upon the photosensitive film 32. The output voltage from the photodetector 36 is correspondingly reduced with the result that it takes longer for the integrator 62 to charge to the reference voltage. Accordingly, the lamp 24 will remain ON for a longer period of time.

The lamp intensity reduction sequence is continued until the lamp intensity is reduced to a value which does not permit the desired light exposure to be made within the available exposure time $T_a$. At this point, the lamp 24 is turned ON for a period which is longer than the period of the reference pulse waveform C. This situation is illustrated in FIG. 3 by Waveforms C-3, D-3, E-3 and F-3. Since the lamp ON cycle is now longer than the reference time, pulse width comparator 78 produces an "increase lamp intensity" output signal on line 98.

It should be understood at this point in the description, that had the initial error been in the opposite direction, i.e., lamp intensity too low, the "increase lamp intensity" signal on comparator output line 98 would have closed pulse actuated switch 100 thereby applying a negative voltage through resistor 102 to amplifier 84. The input voltage to lamp driver 58 would then have been increased until lamp 24 was overdriven and produced too short an exposure time. At that time, the system would correct itself, by applying a decrease lamp current correction voltage $V_1$ to the operational amplifier 94.

It can be seen from the preceding description that once the exposure control system has gone from one error condition to another, the lamp intensity correction will oscillate back and forth between too high an intensity and too low an intensity. Since it is desirable to rapidly converge upon the lamp intensity which produces a lamp ON cycle that brackets the duration of the reference pulse or the available exposure time $T_a$, the gain of amplifier 84 initially should be very high to produce a large percentage correction in lamp intensity. However, once the system has "crossed zero" by going from one error condition to the other error condition, it is desirable to reduce the grain of amplifier 84 to obtain a much smaller percentage change in the corrective variations in light intensity.

The desired two gain state for amplifier 84 is achieved by using a cross zero circuit 104 in conjunction with the previously mentioned pulse actuated switch 88. Looking at FIG. 1, the increase and decrease lamp intensity outputs from pulse width comparator 78 are inputted to the crossed zero circuit 104. When both pulses have occurred, as would be the case when the system passes from one error condition to another i.e., "crossed zero," the crossed zero circuit 104 produces an output pulse on line 106 which opens pulse actuated switch 88. With switch 88 open, a resistor 108 is inserted in the input circuit for amplifier 84 thereby reducing the gain of the amplifier. Thus, once the system has crossed zero from too high a lamp intensity to too low a lamp intensity or vice versa, the gain of amplifier 84 is substantially reduced so that the lamp intensity correction will oscillate between two very close values of lamp intensity. The corresponding effect on the lamp ON cycle is shown in Waveforms C-4, D-4 E-4 and F-4 by the vertical dashed lines.

Although the preceding description has been directed to the use of the exposure control apparatus and method in a photoplotter, it should be understood that the apparatus and method can be used in many other types of photographic equipment in which it is desirable to achieve maximum lamp life and accurate exposure control. By way of example, the apparatus and method can be used in enlargers, contact printers, photocomposing machines and the like.

Having described in detail a preferred embodiment of my invention, it will now be apparent to those skilled in the art that numerous modifications can be made therein without departing from the scope of the invention as defined in the appended claims. What I claim and desire to secure by Letters Patent of the United States is:

1. A method for controlling the light exposure of a photosensitive surface, comprising the steps of:
    (1) establishing a predetermined available exposure time;
    (2) initiating the light exposure to the photosensitive surface;
    (3) generating a signal having a characteristic which represents the amount of light impinging upon said photosensitive surface;
    (4) integrating said signal;
    (5) terminating the light exposure to said photosensitive surface when the integrated signal reaches a predetermined value;
    (6) comparing the time of said light exposure to said predetermined available exposure time;
    (7) reducing the amount of light impinging upon said photosensitive surface if the light exposure time less than the available exposure time and increasing the amount of light impinging upon said photosensitive surface if the light exposure time was greater than the available exposure time; and,
    (8) repeating at least once steps (2) through (5).

2. A method for controlling the light exposure of a photosensitive surface by light from a light source comprising the steps of:
    (1) establishing a predetermined available exposure time;
    (2) initiating the light exposure to the photosensitive surface;
    (3) generating a voltage which is proportional to the amount of light impinging upon the photosensitive surface;
    (4) integrating said voltage;
    (5) terminating the light exposure to said photosensitive surface when the integrated voltage reaches a predetermined value;
    (6) reducing the amount of light impinging upon said photosensitive surface if the light exposure time was less than the available exposure time and increasing the amount of light impinging upon said photosensitive surface if the light exposure time was greater than the available exposure time; and,
    (7) repeating at least once steps (2) through (5).

3. The method of claim 2 wherein the amount of light impinging upon said photosensitive surface is reduced or increased by reducing or increasing, respectively, the intensity of said light source.

4. The method of claim 3 wherein said light source is electrically powered and the light intensity thereof is reduced or increased by reducing or increasing the electrical power applied to said light source.

5. The method of claim 2 further characterized by repeating steps (2) through (6) at least twice and by reducing or increasing the amount of light impinging upon said photosensitive surface by a first percentage as long as step (7) produces either a reduction or an increase in the light impinging upon the photosensitive surface and by a second and smaller percentage when step (7) produces a change from a reduction to an increase or vice versa.

6. An exposure control apparatus for controlling the light exposure of a photosensitive surface by light from a light source comprising:
    (1) means for initiating the light exposure to the photosensitive surface;
    (2) means for generating an output voltage which is proportional to the amount of light impinging upon said photosensitive surface;
    (3) integrator means for integrating said output voltage;
    (4) means for terminating said light exposure when the integrated output voltage reaches a predetermined value;
    (5) means for generating a reference time;
    (6) means for comparing the time of said light exposure to said reference time, said comparing means producing a decrease light signal if the exposure time is less than the reference time and an increase light signal if the exposure time is greater than the reference time; and,
    (7) means responsive to said decrease and increase light signals for reducing or increasing, respectively, the amount of light impinging upon said photosensitive surface.

7. The exposure control apparatus of claim 6 further characterized by said means responsive to said decrease and increase light signals including means for reducing or increasing the intensity of said light source in response to said signals, respectively.

8. The exposure control apparatus of claim 7 wherein said light source is electrically powered and said means for reducing or increasing the intensity of said light source controls the amount of electrical power applied to the light source.

9. The exposure control apparatus of claim 6 wherein said means responsive to said decrease and increase light signals, reduces or increases, respectively, the amount of light impinging upon said photosensitive surface by a first percentage until said signals change from a decrease light signal to an increase light signal or vice versa, and thereafter by a second and smaller percentage in response to said decrease and increase light signals.

References Cited
UNITED STATES PATENTS 3,610,119  10/1971  Gerber et al. _____ 95—1 R SAMUEL S. MATTHEWS, Primary Examiner R. E. ADAMS, Jr., Assistant Examiner U.S. Cl. X.R.

355—69